(12) United States Patent
Kawai et al.

(10) Patent No.: US 9,416,664 B2
(45) Date of Patent: Aug. 16, 2016

(54) METHOD OF FORMATION OF IMPELLER WITH SHAPE DEFINED BY PLURALITY OF LINES AND SUCH IMPELLER

(71) Applicant: FANUC CORPORATION, Minamitsuru-gun, Yamanashi (JP)

(72) Inventors: Satoru Kawai, Yamanashi (JP); Kazuya Ohta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 64 days.

(21) Appl. No.: 14/146,836

(22) Filed: Jan. 3, 2014

(65) Prior Publication Data

US 2014/0193268 A1 Jul. 10, 2014

(30) Foreign Application Priority Data

Jan. 9, 2013 (JP) ................................. 2013-001673

(51) Int. Cl.
*F01D 5/14* (2006.01)
*F04D 29/28* (2006.01)
*F04D 29/38* (2006.01)

(52) U.S. Cl.
CPC ............... *F01D 5/14* (2013.01); *F04D 29/281* (2013.01); *F04D 29/284* (2013.01); *F04D 29/388* (2013.01); *G05B 2219/45225* (2013.01); *Y10T 29/49336* (2015.01)

(58) Field of Classification Search
CPC ... F04D 29/2216; F04D 29/242; F04D 29/30; F04D 29/281; F04D 29/284; F04D 29/282; F04D 29/388; F05D 2240/301; F01D 5/14; F01D 5/147

See application file for complete search history.

(56) References Cited

U.S. PATENT DOCUMENTS

| | | | |
|---|---|---|---|
| 6,340,284 B1 | 1/2002 | Beeck et al. | |
| 6,340,287 B1 | 1/2002 | Eino | |
| 2004/0255917 A1* | 12/2004 | Mokry | 123/559.1 |
| 2012/0107131 A1* | 5/2012 | Ho et al. | 416/241 R |
| 2012/0263599 A1* | 10/2012 | Sugimura et al. | 416/223 A |
| 2012/0301287 A1* | 11/2012 | Swiatek et al. | 415/204 |

FOREIGN PATENT DOCUMENTS

| | | |
|---|---|---|
| CN | 101010158 | 8/2007 |
| JP | 04-54997 | 5/1992 |

(Continued)

OTHER PUBLICATIONS

Chinese Office Action for CN 2014 123101295470 dated Jan. 6, 2015.

*Primary Examiner* — Richard Edgar
*Assistant Examiner* — Brian P Wolcott
(74) *Attorney, Agent, or Firm* — RatnerPrestia (57) ABSTRACT

An impeller (10) where each of the blades (34) includes a first part (14) which is positioned at a base end side of the hub (5) and a second part (24) which is positioned at a distal end side of the hub, the first part being formed by connecting a first hub surface curve (12) which extends along a hub surface of the hub and a first shroud surface curve (11) which extends along a shroud surface of the blade by a first group of lines (13), and the second part is formed by connecting a second hub surface curve (22) which extends along a hub surface of the hub and connects with the first hub surface curve and a second shroud surface curve (21) which extends along the shroud surface and connects with the first shroud surface curve by a second group of lines (23).

2 Claims, 9 Drawing Sheets

(56) References Cited

FOREIGN PATENT DOCUMENTS

| | | | |
|---|---|---|---|
| JP | 08-254198 | 10/1996 | |
| JP | 2004308647 A | * 11/2004 | |
| JP | EP 2395246 A1 | * 12/2011 | ............ F04D 29/284 |
| WO | WO 2010090062 A1 | * 8/2010 | |

* cited by examiner

METHOD OF FORMATION OF IMPELLER WITH SHAPE DEFINED BY PLURALITY OF LINES AND SUCH IMPELLER

BACKGROUND OF THE INVENTION

1. Field of the Invention

The present invention relates to a method of formation of an impeller which is used in a compressor and blower etc. and to an impeller which is formed by such a method.

2. Description of the Related Art

In a compressor and blower etc., an impeller with a plurality of blades attached to a hub is used. In general, these blades are expressed by connecting curves which extend along a hub surface and curves which extend along a shroud surface by a plurality of straight lines.

Figure 7A:
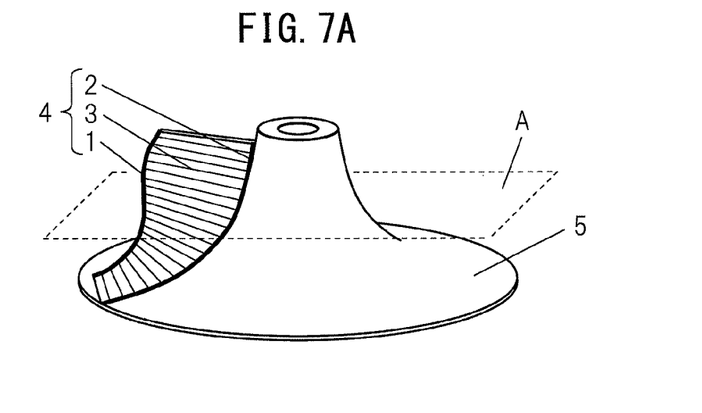
FIG. 7A is a perspective view of an impeller for explaining the general technique which expresses a blade.

FIG. 7A is a perspective view of an impeller for explaining a general technique for expressing a blade. To facilitate understanding, FIG. 7A shows only a single blade 4.

First, a curve 2 which extends along the hub surface and a curve 1 which extends along the shroud surface are defined. Then, each of these curves 1, 2 is divided into a predetermined number of equal intervals. After that, the divided locations of the curves 1, 2 are connected by a plurality of straight lines 3. Due to this, a blade 4 is formed (see FIG. 7B which is a view along the meridian of the blade which is shown in FIG. 7A).

By employing such a technique, it is possible to simply form a blade. Further, Japanese Patent Publication No. 8-254198A, FIG. 6, and Japanese Utility Model Publication No. 4-54997U, FIG. 3, show similarly formed blades.

Figure 7B:
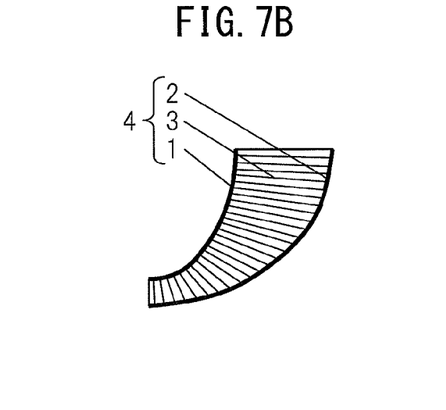
FIG. 7B is a view on a meridian plane of the blade which is shown in FIG. 7A.
Figure 7C:
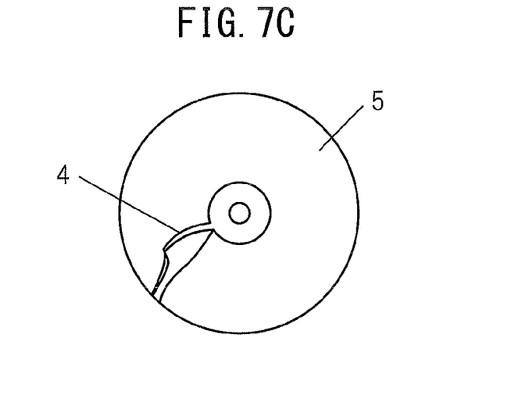
FIG. 7C is a cross-sectional view of an impeller at a plane A of FIG. 7A.

In this regard, as can be seen from FIG. 7B, when using the above technique to express a blade, the curve 2 which extends along the hub surface is longer than the curve 1 which extends along the shroud surface. In this regard, FIG. 7C is a cross-sectional view of the impeller in the plane A of FIG. 7A. The plane A extends in the vertical direction with respect to the axis of the hub 5. As shown in FIG. 7C, the cross-section of the blade 4 is for example curved in the counter clockwise direction.

However, when a blade with a cross-section of a substantially straight shape is required, a blade with a cross-section of a curved shape does not satisfy the required performance. In such a case, it is necessary to again redefine the curve 2 which extends along the hub surface and the curve 1 which extends along the shroud surface. Such work is complicated and requires tremendous time.

The present invention was made in consideration of such a situation and has as its object the provision of a method of formation of an impeller which enables the easy formation of a high performance impeller which is provided with a blade with a cross-section of a substantially straight shape and an impeller which is formed by such a method.

SUMMARY OF THE INVENTION

To achieve the above-mentioned object, according to a first aspect, there is provided a method of formation of an impeller comprised of a hub on the hub surface of which a plurality of blades are provided, the method of formation of an impeller comprising a step of preparing a hub, a first curve defining step which defines a first hub surface curve which extends along a hub surface of the hub and a first shroud surface curve which extends along a shroud surface of a blade to be formed, at a base end side of the hub, a first part forming step which connects the first hub surface curve and first shroud surface curve by a first group of lines to form a first part of the blade to be formed, a second curve defining step which defines a second hub surface curve which extends along a hub surface of the hub and connects with the first hub surface curve and a second shroud surface curve which extends along the shroud surface and connects with the first shroud surface curve, at a distal end side of the hub, a second part forming step which connects the second hub surface curve and second shroud surface curve by a second group of lines to form a second part of the blade to be formed, a single blade forming step which couples the first part and the second part to form a single blade, and a multiple blade forming step which repeats the first curve defining step to the blade forming step to arrange a plurality of blades to a hub surface of the hub.

According to a second aspect, there is provided the first aspect wherein the method further comprises a short blade forming step which provides a plurality of short blades which are shorter than the blade at a hub surface of the hub and wherein the first part of the blade is a shape which corresponds to the short blades.

According to a third aspect, there is provided an impeller which is formed by a method of formation of the first or second aspect.

According to a fourth aspect, there is provided an impeller comprised of a hub on the hub surface of which a plurality of blades are provided, wherein each of the blades includes a first part which is positioned at a base end side of the hub and a second part which is positioned at a distal end side of the hub, the first part is formed by connecting a first hub surface curve which extends along a hub surface of the hub and a first shroud surface curve which extends along a shroud surface of the blade, by a first group of lines, and the second part is formed by connecting a second hub surface curve which extends along a hub surface of the hub and connects with the first hub surface curve and a second shroud surface curve which extends along the shroud surface and connects with the first shroud surface curve, by a second group of lines.

According to a fifth aspect, there is provided the fourth aspect wherein the impeller further comprising a plurality of short blades which are shorter than the blade and are arranged between adjoining blades and wherein the first part of the blade is a shape which corresponds to the short blades.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1A:
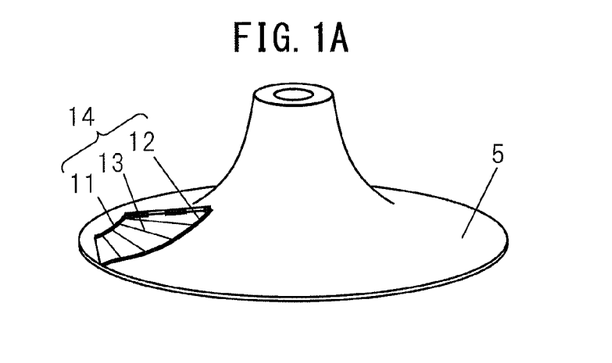
FIG. 1A is a first perspective view of an impeller based on a first embodiment of the present invention.

FIG. 1A is a first perspective view of an impeller based on a first embodiment of the present invention. The impeller of the present invention is used in a compressor and blower etc. In FIG. 1A, the hub 5 of the impeller is prepared in a state with the axis directed in the vertical direction. Further, at the hub surface of the hub 5, a first part 14 of one blade is shown. The first part 14 is one part of a blade which is positioned at a base end side of the hub 5.

As shown in the figure, the two edge parts of the first part 14 are defined by a first hub surface curve 12 which extends along a hub surface and a first shroud surface curve 11 which extends along a shroud surface of a blade. In FIG. 1A, a line segment which connects a top end of the first hub surface curve 12 and a top end of the first shroud surface curve 11 is preferably vertical to the axis of the hub 5. Note that, a line segment which connects a bottom end of the first hub surface curve 12 and a bottom end of the first shroud surface curve 11 need not be vertical to the axis of the hub 5.

Figure 1B:
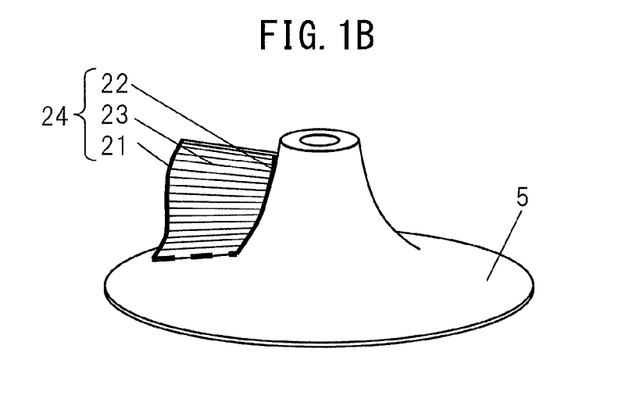
FIG. 1B is a second perspective view of an impeller based on a first embodiment of the present invention.

FIG. 1B is a second perspective view of an impeller based on a first embodiment of the present invention. In FIG. 1B, at the hub surface of the hub 5, a second part 24 to be coupled with the first part 14 of FIG. 1A is shown. The second part 24 is a part of the blade which is positioned at the distal end side of the hub 5. In the first embodiment of the present invention, the first part 14 and the second part 24 form a single blade.

As shown in the figure, two edge parts of the second part 24 are defined by a second hub surface curve 22 which extends along a hub surface and a second shroud surface curve 21 which extends along a shroud surface of a blade. In FIG. 1B, a line segment which connects a bottom end of the second hub surface curve 22 and a bottom end of the second shroud surface curve 21 is preferably vertical to the axis of the hub 5. Note that, a line segment which connects a top end of the second hub surface curve 22 and a top end of the second shroud surface curve 21 need not be vertical to the axis of the hub 5.

Figure 1C:
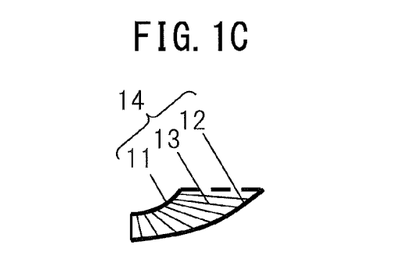
FIG. 1C is a view at a meridian plane of a first part which is shown in FIG. 1A.
Figure 1D:
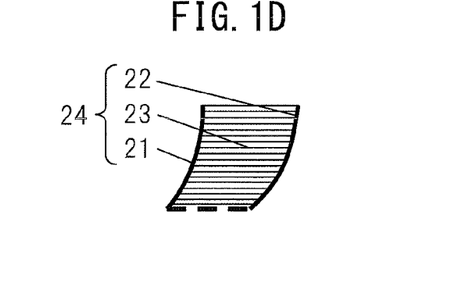
FIG. 1D is a view at a meridian plane of a second part which is shown in FIG. 1B.

FIG. 1C and FIG. 1D are views at the meridian plane of a first part 14 and second part 24 which are shown in FIG. 1A and FIG. 1B, respectively. As shown in FIG. 1C, each of the first shroud surface curve 11 and first hub surface curve 12 is divided into a predetermined number of equal intervals. Further, each of the divided locations of the first shroud surface curve 11 and first hub surface curve 12 are connected by a plurality of lines 13. Further, in FIG. 1D as well, in the same way, the divided locations of the second shroud surface curve 21 and second hub surface curve 22 are connected by a plurality of lines 23.

The number of lines in the group of lines 13 of FIG. 1C is smaller than the number of lines in the group of lines 23 of FIG. 1D. However, the number of lines in the group of lines 13 may be greater than the number of lines in the group of lines 23. Further, the numbers of lines in the groups of lines 13, 23 may be equal to each other. Of course, it is clear that the greater the numbers of lines in the groups of lines 13, 23, the more precisely the blade can be formed.

Figure 1E:
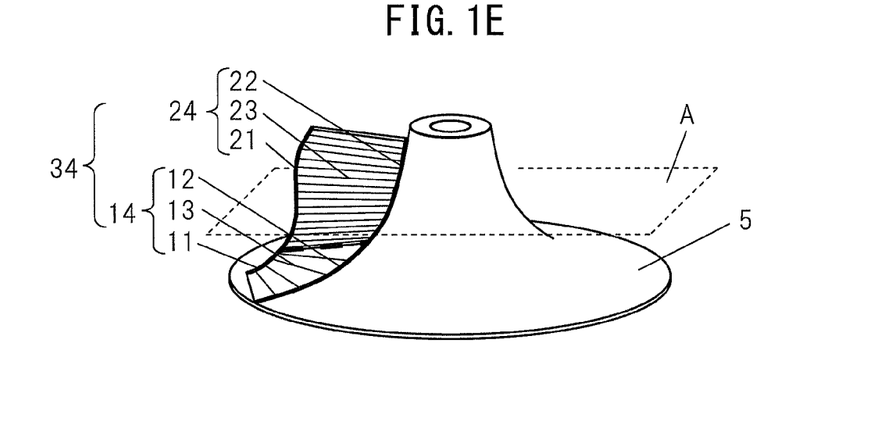
FIG. 1E is a third perspective view of an impeller based on a first embodiment of the present invention.
Figure 1F:
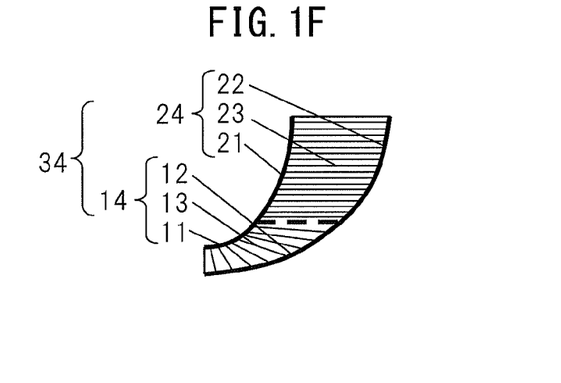
FIG. 1F is a view at the meridian plane of a blade which is shown in FIG. 1E.

FIG. 1E is a third perspective view of an impeller based on a first embodiment of the present invention. In FIG. 1E, the first part 14 and the second part 24 are coupled with each other. Further, FIG. 1F is a view at the meridian plane of a blade which is shown in FIG. 1E. As can be seen from these figures, the first part 14 and the second part 24 together form a single blade 34. In this way, in the present invention, when forming a single blade, the blade is divided in advance into a first part 14 and second part 24 in the axial direction, then these first part 14 and second part 24 are coupled.

As can be seen from FIG. 1E and FIG. 1F, this blade 34 is formed by the top end of the first part 14 and the bottom end of the second part 24 being smoothly connected with each other. In other words, the first shroud surface curve 11 and second shroud surface curve 21 and the first hub surface curve 12 and second hub surface curve 22 are determined in dimensions so that the blade 34 can be formed.

After that, other blades 34 of the same shape are arranged at equal intervals in the circumferential direction at the hub surface of the hub 5. The technique of forming the other blades 34 is similar to that explained above. In this way, an impeller 10 in the first embodiment is formed.

Figure 1G:
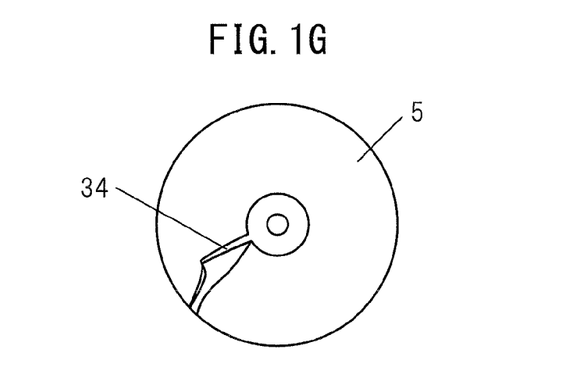
FIG. 1G is a cross-sectional view of an impeller as seen along a plane A of FIG. 1E.

FIG. 1G is a cross-sectional view of an impeller as seen along the plane A of FIG. 1E. As can be seen from FIG. 1E, the plane A intersects the second part 24 adjoining the boundary part between the first part 14 and the second part 24. In FIG. 1F, the cross-section of the blade 34 is a substantially straight shape which extends in the radial direction. In other words, in the present invention, it is possible to easily form a blade 34 with a cross-section of a substantially straight shape in a direction vertical to the axis of the hub. Such a shape of blade 34 satisfies the predetermined required performance, so does not have to be formed again. Therefore, it is possible to form such a shape of blade 34 in an extremely short time.

In one embodiment, the curve comprised of the first hub surface curve 12 and the second hub surface curve 22 in FIG. 1F is made one the same in shape and length as the curve 2 in FIG. 7A, while the curve comprised of the first shroud surface curve 11 and the second shroud surface curve 21 in FIG. 1G is made one the same in shape and length as the curve 1 in FIG. 7A. In such a case as well, the cross-section of the blade 34 becomes a straight shape. Such a shape of blade can be easily prepared.

In the present invention, the first part 14 and the second part 24 are formed separately, then these are combined to form the blade 34. Therefore, even if the shape is relatively complex, it is possible to easily form the blade 34. Further, it will be understood that such a technique is extremely advantageous when drawing an impeller 10 on a computer screen.

Furthermore, if connecting the curves 11, 12 etc. by the group of lines 13 etc., when actually machining the blade, the tool is made to move in parallel to the lines of the group of lines 13. Therefore, connecting the curves 11, 12 etc. by the group of lines 13 etc. is particularly advantageous when preparing a blade by NC machining.

Figure 2:
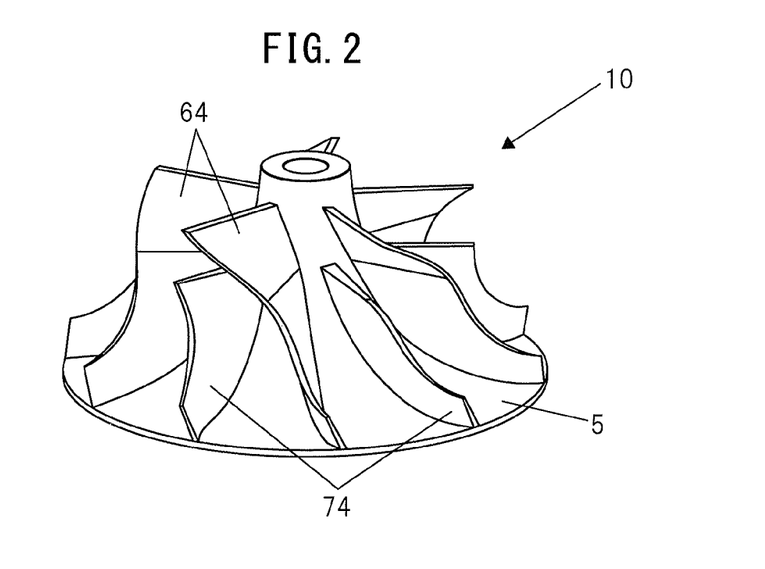
FIG. 2 is a first perspective view of an impeller based on a second embodiment of the present invention.

FIG. 2 is a first perspective view of an impeller based on a second embodiment of the present invention. The impeller 10 which is shown in FIG. 2 is provided with a plurality of long blades 64 and a plurality of short blades 74 shorter than the long blades 64 at the hub surface of the hub 5. As can be seen from FIG. 2, these long blades 64 and short blades 74 are arranged at equal intervals in the circumferential direction alternately. Further, the long blades 64 extend generally from the base end to the distal end of the hub 5, while the short blades 74 extend from the base end of the hub 5 to the middle of the hub 5.

FIG. 3A to FIG. 3F are second to seventh perspective views of an impeller based on a second embodiment of the present invention. Below, the technique for formation of an impeller 10 in the second embodiment will be explained while referring to these figures.

Figure 3A:
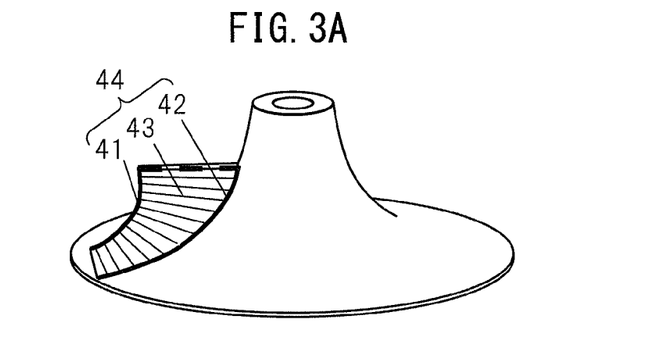
FIG. 3A is a second perspective view of an impeller based on a second embodiment of the present invention.

First, as shown in FIG. 3A, a first part 44 of a long blade 64 is formed. The first part 44 is one part of a long blade 64 which is positioned at a base end side of the hub 5. As explained above, a first hub surface curve 42 which extends along a hub surface and a first shroud surface curve 41 which extends along a shroud surface of the long blade are defined. Then, these first shroud surface curve 41 and first hub surface curve 42 are connected as explained above by a plurality of group of lines 43.

Figure 3B:
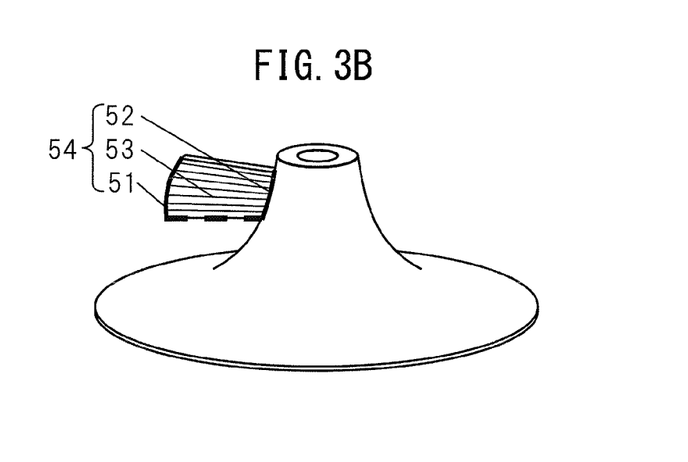
FIG. 3B is a third perspective view of an impeller based on a second embodiment of the present invention.

Further, as shown in FIG. 3B, a second part 54 of the same long blade 64 is formed. The second part 54 is one part of the long blade 64 which is positioned at the distal end side of the hub 5. In other words, as can be seen from FIG. 3B, a second hub surface curve 52 which extends along the hub surface and a second shroud surface curve 51 which extends along the shroud surface of the long blade are defined. Further, these second shroud surface curve 51 and second hub surface curve 52 are connected by a plurality of groups of lines 53 as explained above.

Figure 3C:
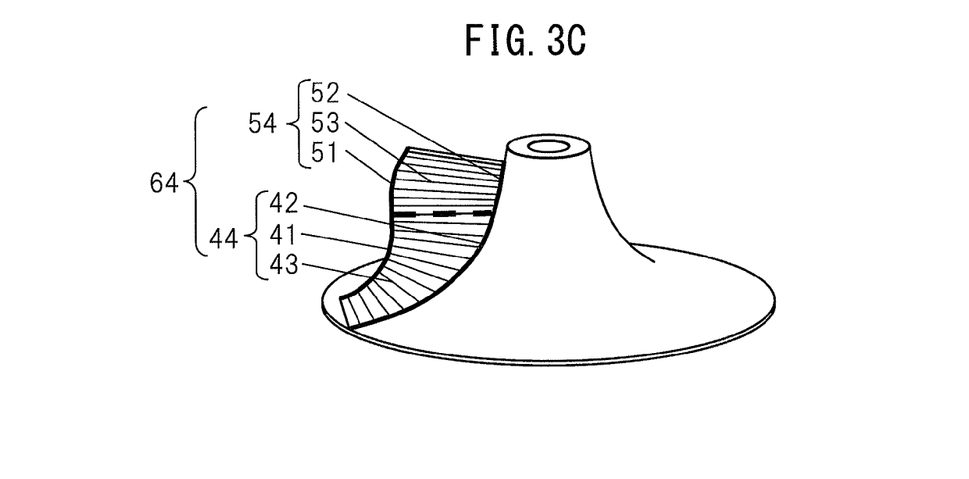
FIG. 3C is a fourth perspective view of an impeller based on a second embodiment of the present invention.
Figure 3D:
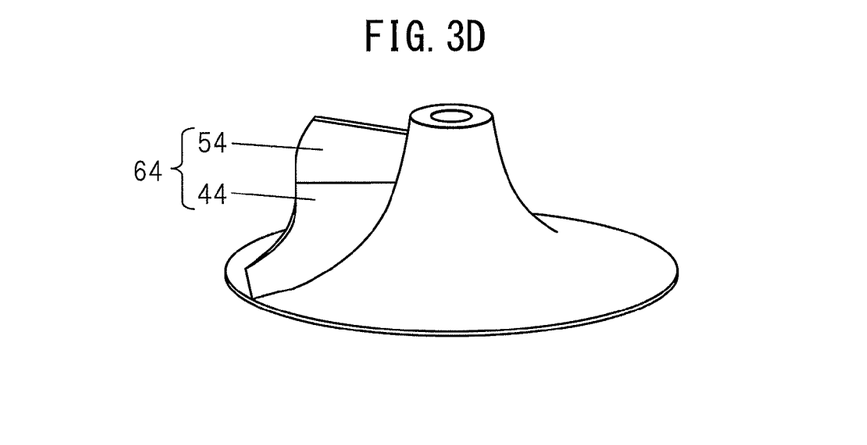
FIG. 3D is a fifth perspective view of an impeller based on a second embodiment of the present invention.
Figure 3E:
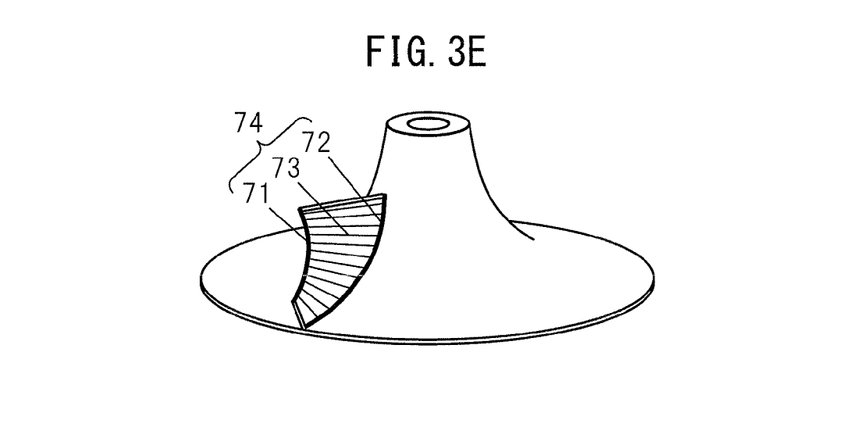
FIG. 3E is a sixth perspective view of an impeller based on a second embodiment of the present invention.

After that, as shown in FIG. 3C, the first part 44 and second part 54 are coupled together. As can be seen from FIG. 3C, the first shroud surface curve 41 and second shroud surface curve 51 are smoothly connected with each other and the first hub surface curve 42 and second hub surface curve 52 are smoothly connected with each other. In other words, the first part 44 and second part 54 are determined in dimensions so as to be smoothly connected with each other. In this way, as shown in FIG. 3D, a single long blade 64 is formed.

Then, a short blade 74 is formed. As can be seen from FIG. 3E, a hub surface curve 72 of the short blade 74 which extends along the hub surface and a shroud surface curve 71 which extends along the shroud surface of the short blade are defined. Further, these shroud surface curve 71 and hub surface curve 72 are connected by a plurality of groups of lines 73 as explained above.

Figure 3F:
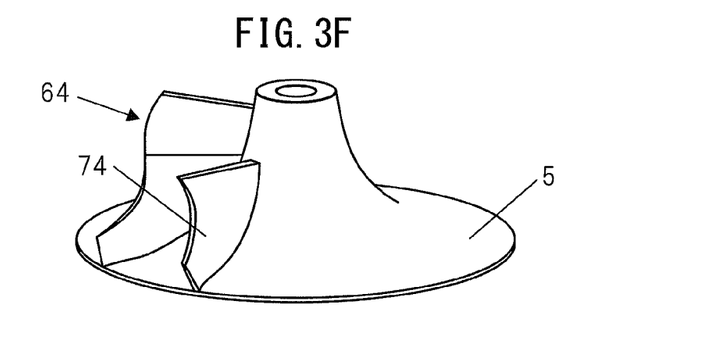
FIG. 3F is a seventh perspective view of an impeller based on a second embodiment of the present invention.

Then, as shown in FIG. 3F, the short blade 74 is arranged at the hub surface of the hub 5 together with the long blade 64. As can be seen from FIG. 3F, the top end of the short blade 74 is positioned at substantially the same height as the boundary part between the first part 44 and second part 54 of the long blade 64. In other words, the first part 44 of the long blade 64 is formed based on the dimensions of the short blade 74. Further, the shape of the first part 44 of the long blade 64 may also not completely match with the shape of the short blade 74.

After that, other long blades 64 and other short blades 74 are arranged at equal intervals in the circumferential direction at the hub surface of the hub 5. The technique of forming the other long blades 64 and other short blades 74 is similar to that explained above. In this way, as shown in FIG. 2, an impeller 10 in the second embodiment is formed.

In such a case as well, it is possible to obtain advantageous effects similar to the ones explained above. Further, it will be understood that when making the shapes of the first parts 44 of the long blades 64 match the shapes of the short. blades 74, it is possible quickly and easily form an impeller 10 of a complicated shape in the second embodiment.

Figure 4:
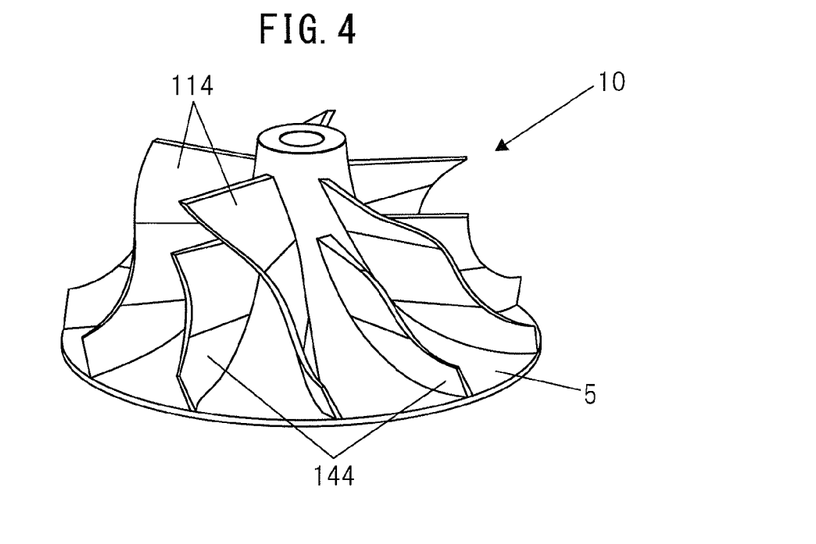
FIG. 4 is a first perspective view of an impeller based on a third embodiment of the present invention.

Furthermore, FIG. 4 is a first perspective view of an impeller according to a third embodiment of the present invention. The impeller 10 which is shown in FIG. 4 is provided with a plurality of long blades 114 and a plurality of short blades 144 shorter than the long blades 114 in a direction along the hub surface at the hub surface of the hub 5. As can be seen from FIG. 4, these long blades 114 and short blades 144 are arranged at equal intervals in the circumferential direction alternately. Further, the long blades 114 extend generally from the base end to the distal end of the hub 5, while the short blades 144 extend from the base end of the hub 5 to the middle of the hub 5.

FIG. 5A to FIG. 5I are a second to 10th perspective views of an impeller based on the third embodiment of the present invention. Below, the technique for formation of the impeller 10 of the third embodiment will be explained while referring to these figures.

Figure 5A:
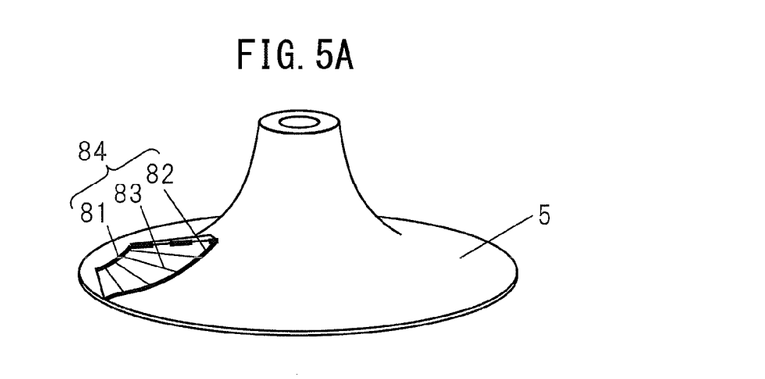
FIG. 5A is a second perspective view of an impeller based on a third embodiment of the present invention.

First, as shown in FIG. 5A, a first part 84 of a long blade 114 is formed. The first part 84 is one part of a long blade 114 which is positioned at a base end side of the hub 5. As explained above, a first hub surface curve 82 which extends along a hub surface and a first shroud surface curve 81 which extends along a shroud surface of a long blade are defined. Then, these first shroud surface curve 81 and first hub surface curve 82 are connected as explained above by a plurality of groups of lines 83.

Figure 5B:
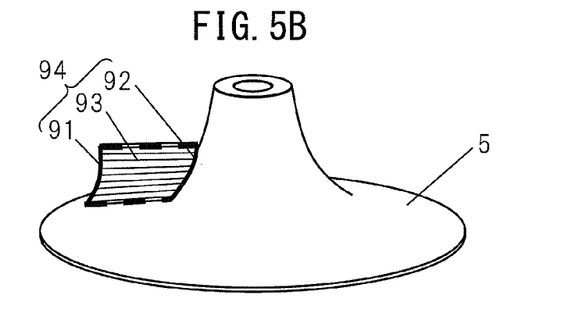
FIG. 5B is a third perspective view of an impeller based on a third embodiment of the present invention.

Further, as shown in FIG. 5B, a second part 94 of the same long blade 114 is formed. The second part 94 is the part coupled to the first part 84 of the long blade 114 and is positioned between the later explained third part 104 and first part 84. As can be seen from FIG. 5B, a second hub surface curve 92 which extends along the hub surface and a second shroud surface curve 91 which extends along the shroud surface of the long blade are defined. Further, these second shroud surface curve 91 and second hub surface curve 92 are connected by a plurality of groups of lines 93 as explained above.

Figure 5C:
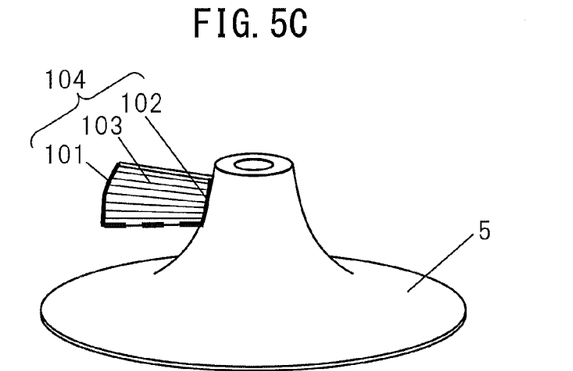
FIG. 5C is a fourth perspective view of an impeller based on a third embodiment of the present invention.

Furthermore, as shown in FIG. 5C, a third part 104 of the same long blade 114 is formed. In the third embodiment, the third part 104 is one part of the long blade 114 which is positioned at the distal end side of the hub 5. In other words, as can be seen from FIG. 5C, a third hub surface curve 102 which extends along the hub surface and a third shroud surface curve 101 which extends along the shroud surface of the long blade are defined. Further, these third shroud surface curve 101 and third hub surface curve 102 are connected by a plurality of groups of lines 103 as explained above.

Figure 5D:
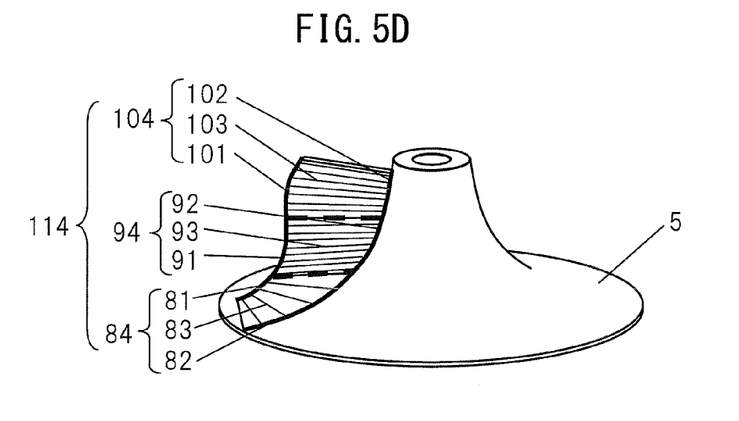
FIG. 5D is a fifth perspective view of an impeller based on a third embodiment of the present invention.
Figure 5E:
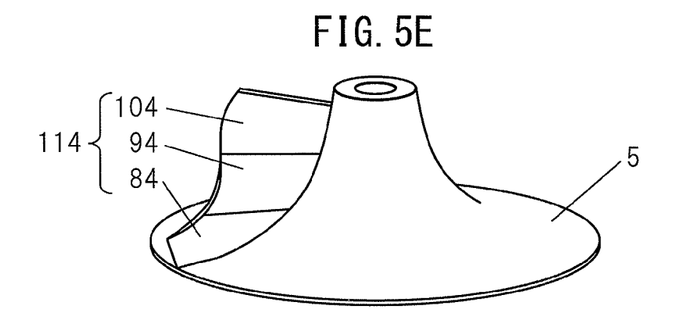
FIG. 5E is a sixth perspective view of an impeller based on a third embodiment of the present invention.

After that, as shown in FIG. 5D, the first part 84, second part 94, and third part 104 are coupled together. As can be seen from FIG. 5D, the first shroud surface curve 81, second shroud surface curve 91, and third shroud surface curve 101 are smoothly connected with each other and the first hub surface curve 82, second hub surface curve 92, and third hub surface curve 102 are smoothly connected with each other. In other words, the first part 84, second part 94, and third part 104 are determined in dimensions so as to be smoothly connected with each other. As shown in FIG. 5E, a single long blade 114 is formed in this way.

Figure 5F:
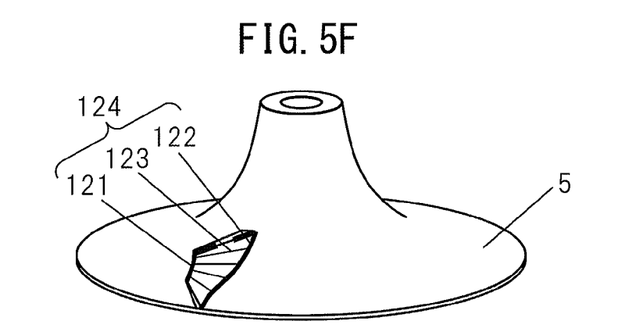
FIG. 5F is a seventh perspective view of an impeller based on a third embodiment of the present invention.

Then, as shown in FIG. 5F, a first part 124 of a short blade 144 is formed. The first part 124 is one part of a short blade 144 which is positioned at the base end side of the hub 5. As explained above, a first hub surface curve 122 which extends along a hub surface and a first shroud surface curve 121 which extends along a shroud surface of a short blade are defined. Then, these first shroud surface curve 121 and first hub surface curve 122 are connected by a plurality of groups of lines 123 as explained above.

Figure 5G:
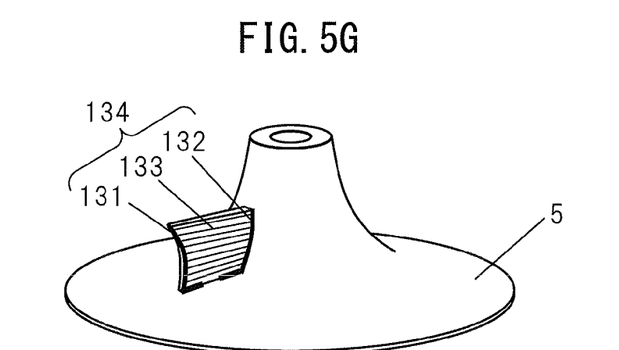
FIG. 5G is an eighth perspective view of an impeller based on a third embodiment of the present invention.

Further, as shown in FIG. 5G, a second part 134 of the same short blade 144 is formed. The second part 134 is a part which is coupled with the first part 124 of the short blade 144. As can be seen from FIG. 5G, a second hub surface curve 132 which extends along the hub surface and a second shroud surface curve 131 which extends along the shroud surface of the short blade are defined. Further, these second shroud surface curve 131 and second hub surface curve 132 are connected by a plurality of groups of lines 133 as explained above.

Figure 5H:
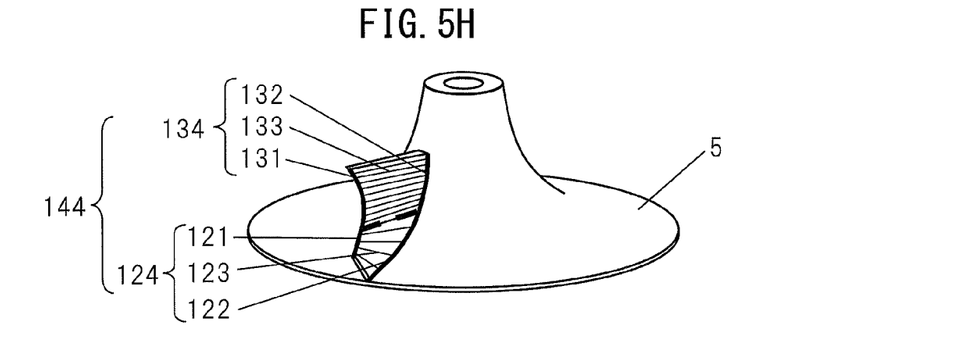
FIG. 5H is a ninth perspective view of an impeller based on a third embodiment of the present invention.

After that, as shown in FIG. 5H, the first part 124 and the second part 134 are coupled with each other. As can be seen from FIG. 5H, the first shroud surface curve 121 and the second shroud surface curve 131 are smoothly connected with each other, while the first hub surface curve 122 and the second hub surface curve 132 are also smoothly connected with each other. In other words, the first part 124 and the second part 134 are determined in dimensions so as to be smoothly connected with each other. As shown in FIG. 5H, a single short blade 144 is formed.

Figure 5I:
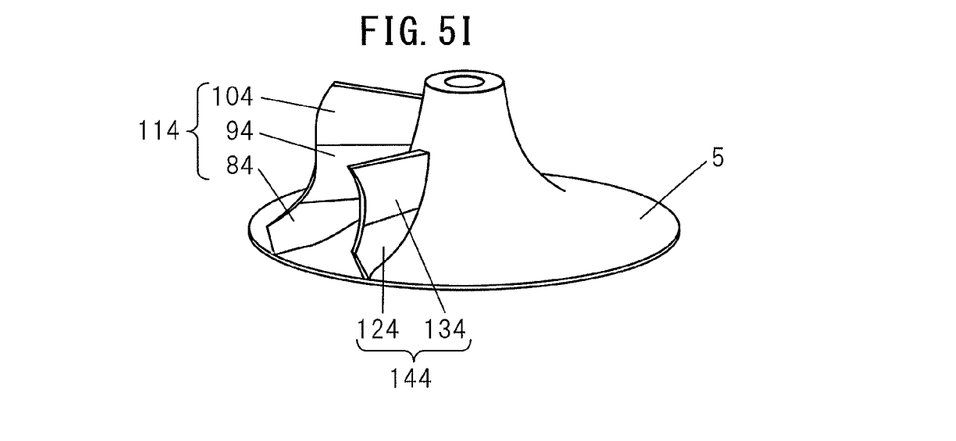
FIG. 5I is a 10th perspective view of an impeller based on a third embodiment of the present invention.

After that, as shown in FIG. 5I, the short blade 144 is arranged at the hub surface of the hub 5 together with the long blade 114. As can be seen from FIG. 5I, the top end of the short blade 144 is positioned at substantially the same height as the boundary part of the second part 94 and third part 104 of the long blade 114. In other words, the first part 84 and second part 94 of the long blade 114 are formed based on the dimensions of the short blade 144.

Further, the shapes of the first part 84 and second part 94 of the long blade 114 may also completely match the shapes of the first part 124 and second part 134 of the short blade 144. In this case, the boundary part of the first part 84 and second part 94 of the long blade 114 is positioned at substantially the same height as the boundary part between the first part 124 and the second part 134 of the short blade 144.

After that, other long blades 114 and other short blades 144 are arranged at equal intervals in the circumferential direction at the hub surface of the hub 5. The technique of formation of the other long blades 114 and other short blades 144 is similar to that explained above. As shown in FIG. 4, in this way, the impeller 10 in the third embodiment is formed.

In such a case as well, it is possible to obtain advantageous effects similar to ones explained above. Further, it will be understood that when making the shapes of the first part 84 and second part 94 of the long blade 114 match the shapes of the first part 124 and second part 134 of the short blade 144, it is possible quickly and easily form an impeller 10 of a complicated shape in the third embodiment.

Figure 6:
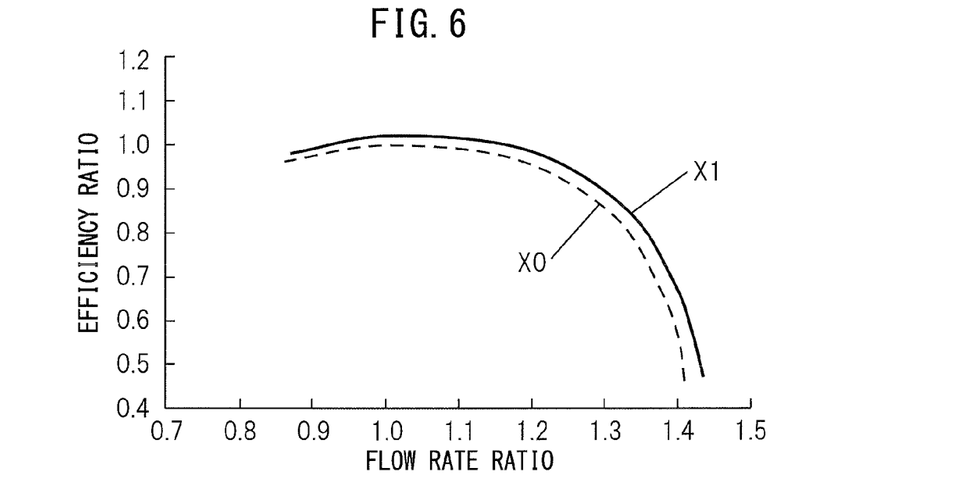
FIG. 6 is a view which shows a relationship of a flow rate ratio and an efficiency ratio.

In this regard, FIG. 6 is a view which shows the relationship of the flow rate ratio and efficiency ratio. In FIG. 6, the abscissa indicates a flow rate ratio of the impeller while, the ordinate indicates the efficiency ratio. Further, in FIG. 6, the broken line X0 shows the behavior of an impeller of the prior art, while the solid line X1 shows the behavior of the impeller 10 in the first embodiment of the present invention. As can be seen from FIG. 6, it was learned that the efficiency of the impeller 10 becomes higher than even the efficiency of the impeller of the prior art. Therefore, the impeller 10 of the present invention which has a blade with a cross-section of a substantially straight shape is advantageous compared with the impeller of the prior art. In the present invention, it is easy to form such a high performance impeller 10 as explained above.

ADVANTAGEOUS EFFECTS OF INVENTION

In the first, third, and fourth aspects, it is possible to easily form an impeller which is provided with a blade with a cross-section of a substantially straight shape, which is vertical to the axis of the hub.

In the second and fifth aspects, the impeller can be quickly formed.

Typical embodiments were used to explain the present invention, but a person skilled in the art would understand that the above-mentioned changes and various other changes, deletions, and additions may be made without departing from the scope of the present invention.

The invention claimed is:

1. A method of formation of an impeller comprised of a hub on a hub surface of which a plurality of blades are provided, the method of formation of an impeller comprising
a step of preparing the hub,
a first curve defining step which defines a first hub surface curve which extends along a hub surface of said hub and a first shroud surface curve which extends along a shroud surface of a blade to be formed, at a base end side of said hub, wherein a straight line segment which connects a top end of the first hub surface curve and a top end of the first shroud surface curve is in a plane that is perpendicular to an axis of rotation of the hub;
a first dividing step in which each of the first hub surface curve and the first shroud surface curve is divided into a predetermined number of equal intervals at divided locations of equal intervals,
a first part forming step which connects each of the divided locations of equal intervals of the first hub surface curve and first shroud surface curve by a first group of the straight line segments to form a first part of the blade, whereby each divided location is coextensive with adjacent straight line segments of the first group of the straight line segments,
a second curve defining step which defines a second hub surface curve which extends along a hub surface of said hub and connects with said first hub surface curve and a second shroud surface curve which extends along said shroud surface and connects with said first shroud surface curve, at a distal end side of said hub, wherein a straight line segment of the second curve which connects a bottom end of the second hub surface curve and a bottom end of the second shroud surface curve is parallel to the plane that passes through the axis of rotation of the hub;

a second dividing step in which each of the second hub surface curve and the second shroud surface curve is divided into a predetermined number of equal intervals at divided locations of equal intervals, a second part forming step which connects each of the divided locations of equal intervals of the second hub surface curve and second shroud surface curve by a second group of the straight line segments of the second curve to form a second part of said blade, whereby each divided location of the second curve is coextensive with adjacent straight line segments of the second group of the straight line segments, a single blade forming step which couples said first part and said second part to form a single blade, a multiple blade forming step which repeats said first curve defining step to said blade forming step to arrange a plurality of blades to a hub surface of said hub, and a short blade forming step which provides a plurality of short blades which are shorter in height than said blade at a hub surface of said hub, and wherein said first part of said blade has a height that is substantially equal to a height of said short blades.

2. An impeller which is formed by a method of formation according to claim 1.

\* \* \* \* \*